United States Patent
Saiki et al.

(10) Patent No.: US 10,529,998 B2
(45) Date of Patent: Jan. 7, 2020

(54) FUEL CELL STACK, AND METHOD OF DETERMINING MAINTENANCE TIME OF FUEL CELL STACK

(71) Applicant: HONDA MOTOR CO., LTD., Minato-Ku, Tokyo (JP)

(72) Inventors: Katsunori Saiki, Utsunomiya (JP); Masao Utsunomiya, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 199 days.

(21) Appl. No.: 15/270,220

(22) Filed: Sep. 20, 2016

(65) Prior Publication Data

US 2017/0092970 A1 Mar. 30, 2017

(30) Foreign Application Priority Data

Sep. 25, 2015 (JP) .................................. 2015-188356

(51) Int. Cl.
*H01M 8/04537* (2016.01)
*H01M 8/1004* (2016.01)
(Continued)

(52) U.S. Cl.
CPC ..... *H01M 8/04559* (2013.01); *H01M 8/1004* (2013.01); *H01M 8/241* (2013.01);
(Continued)

(58) Field of Classification Search
CPC ......... H01M 8/04664; H01M 8/04574; H01M 8/04671; H01M 8/04858; H01M 8/04865;
(Continued)

(56) References Cited

U.S. PATENT DOCUMENTS

2010/0178590 A1* 7/2010 Shirakawa .......... H01M 8/0232
429/507
2013/0189596 A1* 7/2013 Kawahara ......... H01M 8/04559
429/413

FOREIGN PATENT DOCUMENTS

CA 2456770 A1 * 8/2004 .............. H01M 8/02
JP 08-315846 A 11/1996
(Continued)

OTHER PUBLICATIONS

Office Action dated Jul. 11, 2017 issued in the corresponding Japanese Patent Application 2015-188356 with the English translation thereof.

*Primary Examiner* — Cynthia H Kelly
*Assistant Examiner* — Rashid A Alam
(74) *Attorney, Agent, or Firm* — Carrier Blackman & Associates, P.C.; William D. Blackman; Joseph P. Carrier

(57) ABSTRACT

A fuel cell includes a fuel cell stacked body in which a plurality of fuel cells are stacked in a first direction, a pair of end plates which sandwiches the fuel cell stacked body in the first direction, and a load measurement unit that is disposed between at least one of the pair of end plates and the fuel cell stacked body, and detects an electrode load, which acts on a power generation surface of the fuel cells, in the first direction. The load measurement unit includes a first conductive material, second conducive materials between which the first conductive material is interposed in the first direction, and which include a contact portion that is in contact with the first conductive material, and a detection unit that detects a voltage drop between the second conductive materials, which face each other in the first direction, with the first conductive material interposed therebetween.

2 Claims, 8 Drawing Sheets

(51) Int. Cl.
  *H01M 8/241* (2016.01)
  *H01M 8/247* (2016.01)
  *H01M 8/1018* (2016.01)

(52) U.S. Cl.
  CPC .... *H01M 8/247* (2013.01); *H01M 2008/1095* (2013.01); *H01M 2300/0082* (2013.01)

(58) Field of Classification Search
  CPC ......... H01M 8/04873; H01M 8/04895; H01M 8/04892; H01M 8/04604; H01M 8/04611
  USPC ....................................................... 429/432
  See application file for complete search history.

(56) References Cited

FOREIGN PATENT DOCUMENTS

| | | |
|---|---|---|
| JP | 2009-176506 A | 8/2009 |
| JP | 2009-193898 A | 8/2009 |
| JP | 2011-124130 A | 6/2011 |

\* cited by examiner

FUEL CELL STACK, AND METHOD OF DETERMINING MAINTENANCE TIME OF FUEL CELL STACK

CROSS-REFERENCE TO RELATED APPLICATION

Priority is claimed on Japanese Patent Application No. 2015-188356, filed on Sep. 25, 2015, the contents of which are incorporated herein by reference.

BACKGROUND OF THE INVENTION

Field of the Invention

The present invention relates to a fuel cell stack, and a method of determining maintenance time of the fuel cell stack.

Description of Related Art

A fuel cell stack that is mounted on a vehicle includes a fuel cell stacked body (hereinafter, simply referred to as "stacked body") and end plates (for example, refer to Japanese Unexamined Patent Application, First Publication No. H8-315846 (hereinafter, referred to as Patent Document 1)).

The stacked body is constituted by a plurality of unit cells which are stacked. Each of the unit cells includes a membrane-electrode assembly (hereinafter, simply referred to as MEA) having a configuration in which a solid polymer electrolyte membrane is interposed between an anode electrode and a cathode electrode, and separators which sandwich the MEA.

The end plates sandwich the stacked body from both sides in a stacking direction of the unit cells. The end plates are fastened to each other with the stacked body interposed therebetween. Accordingly, a fastening load acts on the unit cells along the stacking direction.

In the above-described fuel cell stack, a hydrogen gas is supplied to the anode electrode as fuel gas, and air is supplied to the cathode electrode as oxidant gas. According to this, a hydrogen ion, which occurs in the anode electrode due to a catalytic reaction, is transmitted through the solid polymer electrolyte membrane and moves to the cathode electrode. In the cathode electrode, the hydrogen ion causes an electrochemical reaction with oxygen in air, and thus power generation is carried out.

In the fuel cell stack, the fastening load, which acts on the unit cells, decreases depending on deterioration (for example, mechanical deterioration or chemical deterioration of the MEA, and the like) of the stacked body. When the fastening load decreases, for example, contact resistance between the unit cells (between separators of adjacent unit cells) increases, and a resistance overvoltage increases. According to this, extraction efficiency of electric power that is generated in the unit cells decreases, and power generation performance deteriorates. In addition, sealing properties between the unit cells deteriorate, and thus there is a concern that leakage of a reaction gas and the like may occur.

Accordingly, for example, Patent Document 1 discloses a configuration in which a decrease in a load, which acts on unit cells, is determined by measuring a voltage drop between two constituent components (for example, a cooling plate and an air electrode) between which the solid polymer electrolyte membrane is not interposed. According to this configuration, the voltage drop increases due to an increase in contact resistance between constituent components in accordance with a decrease in a load, and thus it is considered that the decrease in the load can be determined.

SUMMARY OF THE INVENTION

The central portion of each of the unit cell in an in-plane direction functions as a power generation surface. An outer peripheral portion of the unit cell in the in-plane direction functions as a sealing surface that surrounds the power generation surface. In this case, in the configuration of Patent Document 1, the constituent components are in contact with each other over the entirety of a surface of the unit cell, and thus it is difficult to detect a load (for example, an electrode load that acts on the power generation surface, or a sealing load that acts on the sealing surface) that acts on each site of the unit cells. As a result, it is difficult to specify maintenance time of the fuel cell stack, or a cause for a decrease in a load.

Accordingly, aspects of the invention have been made in consideration of the above-described circumstances, and an object thereof is to provide a fuel cell stack capable of improving maintenance properties, and a method of determining maintenance time of the fuel cell stack.

(1) To accomplish the above-described object, according to an aspect of the invention, there is provided a fuel cell stack including a fuel cell stacked body in which a plurality of fuel cells are stacked in a first direction, a pair of end plates which sandwiches the fuel cell stacked body from both sides in the first direction, and a load measurement unit that is disposed between at least one of the pair of end plates and the fuel cell stacked body, and detects an electrode load, which acts on a power generation surface of the fuel cells, in the first direction. The load measurement unit includes a first conductive material, second conducive materials which sandwich the first conductive material in the first direction, and which include a contact portion that is in contact with the first conductive material, and a detection unit that detects a voltage drop between the second conductive materials, which face each other in the first direction, with the first conductive material interposed therebetween.

(2) According to the aspect (1), an insulator may be disposed between the one end plate and the load measurement unit, and an accommodation portion, which accommodates the load measurement unit from a fuel cell stacked body side in the first direction, may be formed in a portion, which faces the power generation surface in the first direction, of the insulator.

(3) According to another aspect of the invention, there is provided a method of determining maintenance time of the fuel cell stack according to the aspect of (1) or (2). The method includes a determination process of determining a maintenance time on the basis of the voltage drop detected by the detection unit. In the determination process, when the voltage drop is equal to or greater than a threshold value, the maintenance time is determined.

According to the aspect of (1), the voltage drop between the second conductive materials is detected in the load measurement unit, and thus it is possible to detect a decrease in an electrode load in accordance with an increase in contact resistance between the first conductive material and the second conductive material. In this case, for example, it is possible to detect an electrode load that acts on the power generation surface of the fuel cells in a more accurate and simple manner in comparison to a configuration of detecting a fastening load acting on the entirety of a surface, which includes the power generation surface and the sealing surface, of the fuel cells in a stacking direction. In addition, in a case of detecting the fastening load that acts on the fuel cells from the end plates, it is possible to detect a sealing load that acts on the sealing surface of the fuel cells on the basis of the fastening load and the electrode load. As a result, it is possible to detect a load that acts on each site of the fuel cells, and thus it is easy to specify maintenance time due to a decrease in a load or a cause for the decrease in the load. Accordingly, it is possible to improve maintenance properties.

Furthermore, in the load measurement unit, the first conductive material is interposed between the second conductive materials, and thus it is possible to further increase a voltage drop during a decrease in a load in comparison to a case where respective conductive materials are brought into direct contact with each other.

According to the aspect of (2), it is possible to suppress a positional deviation of the load measurement unit with respect to the fuel cells in an in-plane direction of the fuel cells, and it is possible to secure conduction between the power generation surface of the fuel cells and the load measurement unit. In addition, it is possible to suppress an enlargement of the fuel cell stack in a stacking direction in accordance with addition of the load measurement unit.

According to the aspect of (3), in the determination process, in a case where the voltage drop is equal to or greater than a threshold value, the maintenance time is determined, and thus it is possible to prevent the subsequent power generation performance or sealing properties from decreasing in advance. As a result, it is possible to secure operation reliability.

DETAILED DESCRIPTION OF THE INVENTION

Next, an embodiment of the invention will be described with reference to the accompanying drawings.

Fuel Cell Stack

Figure 1:
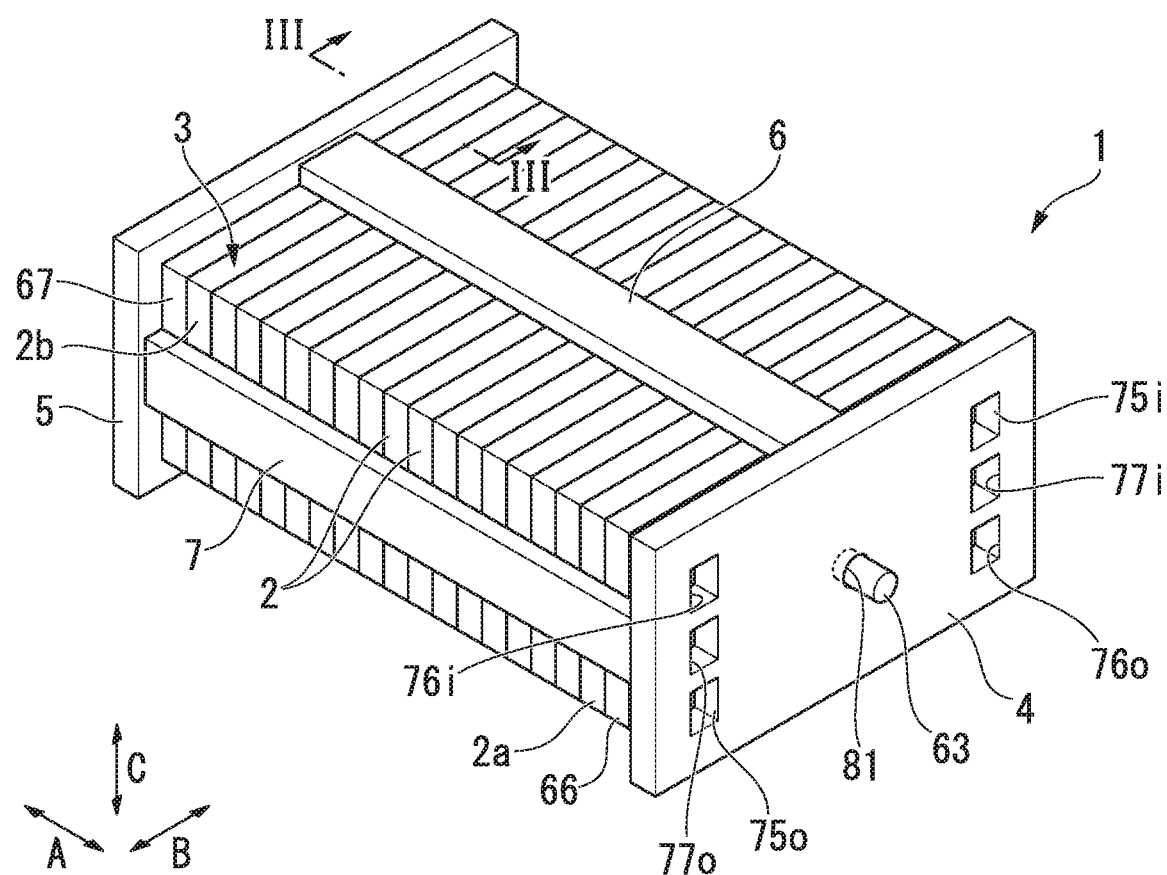
FIG. 1 is a perspective view of a fuel cell stack of this embodiment which is seen from a first end plate side.

FIG. 1 is a perspective view of a fuel cell stack 1 of this embodiment which is seen from a first end plate 4 side.

As illustrated in FIG. 1, the fuel cell stack 1 of this embodiment is mounted in a motor room that is partitioned at the front of a vehicle (not illustrated), or under a floor of the vehicle. For example, the fuel cell stack 1 is used to supply electric power to a drive motor. For example, the fuel cell stack 1 of this embodiment is mounted on the vehicle in such a manner that a "A" direction (first direction) in the drawings becomes a width direction of the vehicle, and a "B" direction becomes a longitudinal direction of the vehicle, and a "C" direction becomes a vertical direction of the vehicle.

Figure 3:
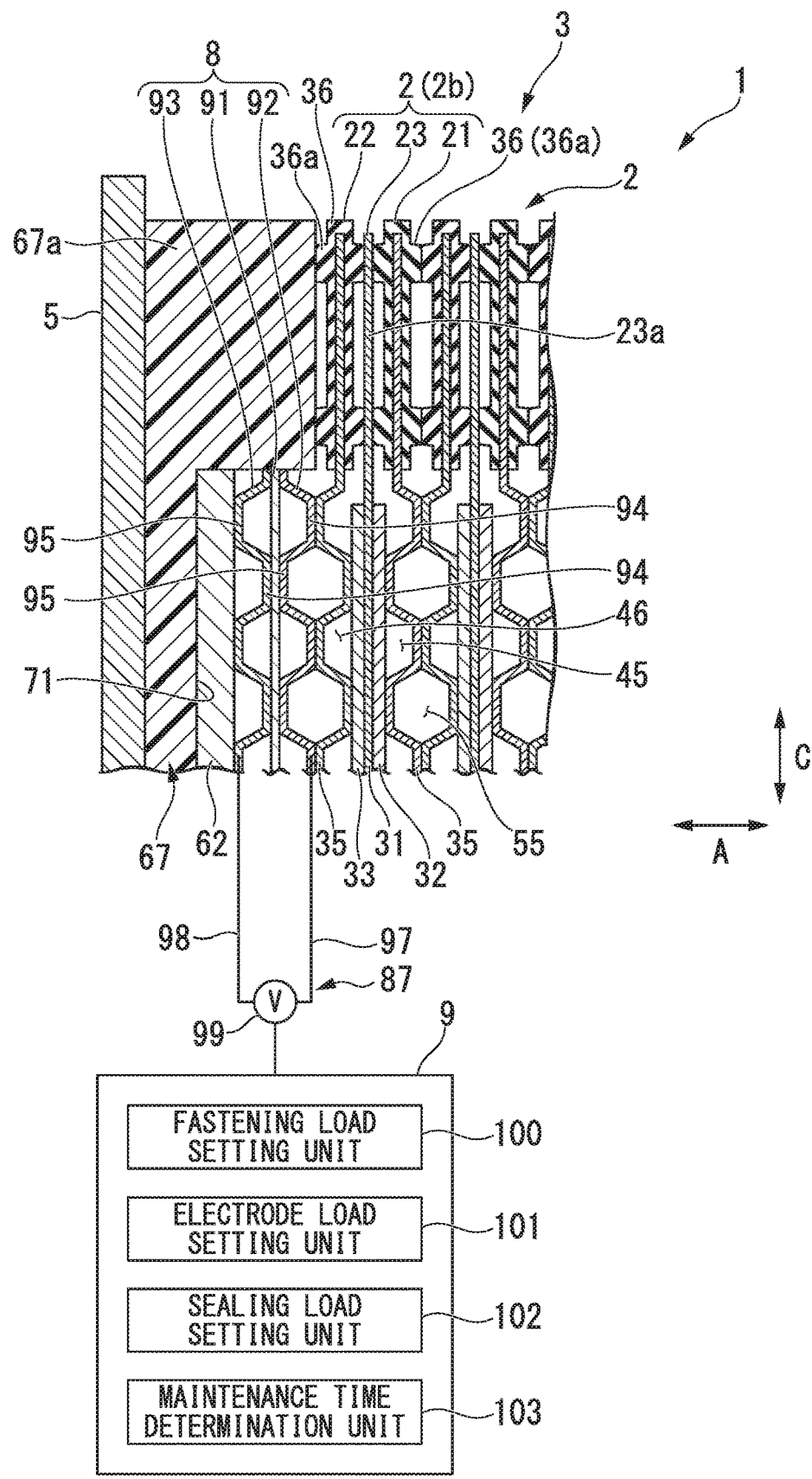
FIG. 3 is a cross-sectional view corresponding to line III-III in FIG. 1.

The fuel cell stack 1 mainly includes a stacked body (fuel cell stacked body) 3, end plates (the first end plate 4 and a second end plate 5), beam members (a first beam member 6 and a second beam member 7), a load measurement unit 8 (refer to FIG. 3), and a control unit 9 (refer to FIG. 3).

The stacked body 3 has a configuration in which a plurality of unit cells (fuel cells) 2 are stacked in the A direction. In the following description, in the A direction, the B direction, and the C direction, a direction, which is close to the central portion of the stacked body 3, may be referred to as an inner side, and a direction, which is spaced away from the central portion of the stacked body 3, may be referred to as an outer side.

Unit Cell

Figure 2:
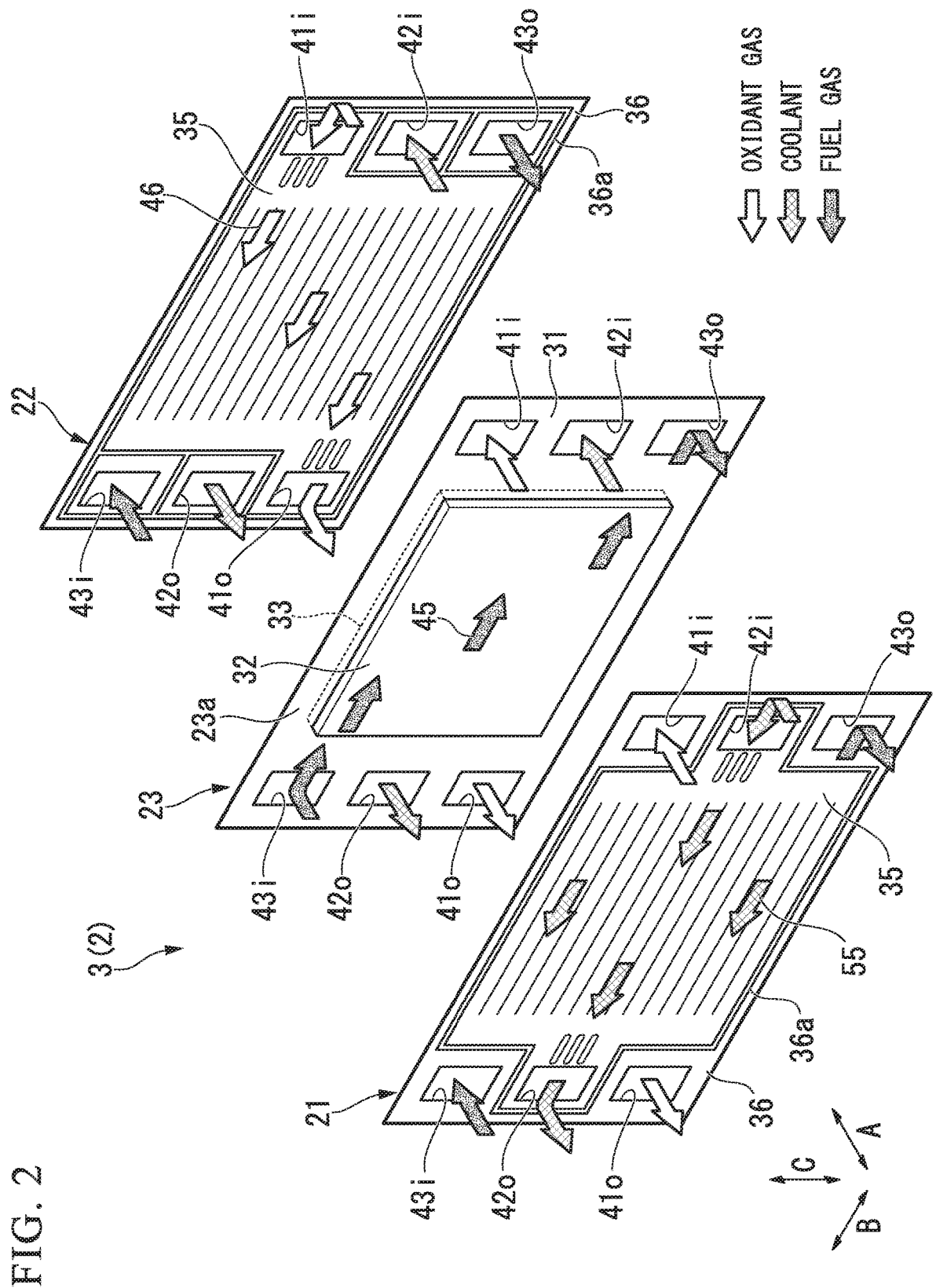
FIG. 2 is an exploded perspective view of a unit cell illustrated in FIG. 1.

FIG. 2 is an exploded perspective view of each of the unit cells 2.

As illustrated in FIG. 2, for example, the unit cell 2 includes a pair of separators 21 and 22, and an MEA 23 that is sandwiched between the separators 21 and 22. The MEA 23 includes a solid polymer electrolyte membrane 31, and an anode electrode 32 and a cathode electrode 33 which sandwich the solid polymer electrolyte membrane 31 from both sides in the A direction.

The anode electrode 32 and the cathode electrode 33 includes a gas diffusion layer formed from carbon paper and the like, and an electrode catalyst layer that is formed by uniformly applying porous carbon particles, in which a platinum alloy is carried on a surface thereof, to a surface of the gas diffusion layer.

For example, the solid polymer electrolyte membrane 31 is formed from a raw material obtained by impregnating a perfluorosulfonic acid polymer with water. An external shape of the solid polymer electrolyte membrane 31 in a front view from the A direction is set to be greater than that of the anode electrode 32 and the cathode electrode 33. In an example in FIG. 2, the anode electrode 32 and the cathode electrode 33 stack each other at the central portion of the solid polymer electrolyte membrane 31. An outer peripheral portion of the solid polymer electrolyte membrane 31 protrudes in a frame shape from the anode electrode 32 and the cathode electrode 33. That is, the central portion of the MEA 23 functions as a power generation surface in which the solid polymer electrolyte membrane 31, the anode electrode 32 and the cathode electrode 33 are stacked.

As illustrated in FIG. 2, the separators 21 and 22, which are provided to the unit cell 2, include a first separator 21 that faces the anode electrode 32 of the MEA 23, and a second separator 22 that faces the cathode electrode 33 of the MEA 23. In the following description, the same reference numerals will be given to the same configurations in the separators 21 and 22, and the separators 21 and 22 will be explained together.

The separators 21 and 22 include a separator plate 35, and a seal member 36 that covers an outer peripheral portion of the separator plate 35.

The separator plate 35 is constituted by a metal plate or a carbon plate which has a rectangular shape in which the B direction is set as a longitudinal direction. In the example in FIG. 2, the separator plate 35 is formed in such a manner that an external shape thereof is the same as that of the solid polymer electrolyte membrane 31 in a front view from the A direction. The separator plate 35 is stacked with the MEA 23 when seen in the A direction.

FIG. 3 is a cross-sectional view taken along line III-III in FIG. 1.

As illustrated in FIG. 3, the seal member 36 is formed from an elastically deformable material (for example, rubber and the like). The seal member 36 includes a protrusion 36a that protrudes in the A direction. The protrusion 36a comes into close contact with the solid polymer electrolyte membrane 31 in the A direction at the outer peripheral portion of the MEA 23. That is, the outer peripheral portion of the MEA 23 functions as a sealing surface 23a that is in close contact with the seal member 36.

As illustrated in FIG. 2, an oxidant gas inlet communication hole 41i, a coolant inlet communication hole 42i, and a fuel gas outlet communication hole 43o are arranged in parallel in the C direction at a first end (right side in FIG. 2) of the unit cell 2 (the solid polymer electrolyte membrane 31, and the separators 21 and 22) in the B direction. The oxidant gas inlet communication hole 41i, the coolant inlet communication hole 42i, and the fuel gas outlet communication hole 43o penetrate the unit cell 2 in the A direction. In the example illustrated in FIG. 2, the oxidant gas inlet communication hole 41i, the coolant inlet communication hole 42i, and the fuel gas outlet communication hole 43o sequentially arranged from an upper side to a lower side.

Oxidant gas (air and the like), which is supplied to the cathode electrode 33, flows through the inside of the oxidant gas inlet communication hole 41i.

A coolant such as pure water and ethylene glycol flows through the inside of the coolant inlet communication hole 42i.

Fuel gas (for example, hydrogen and the like), which passes through the anode electrode 32 and is consumed, flows through the inside of the fuel gas outlet communication hole 43o.

A fuel gas inlet communication hole 43i, a coolant outlet communication hole 42o, and an oxidant gas outlet communication hole 41o are arranged in parallel in the C direction at a second end (left side in FIG. 2) of the unit cell 2 in the B direction. The fuel gas inlet communication hole 43i, the coolant outlet communication hole 42o, and the oxidant gas outlet communication hole 41o penetrate the unit cell 2 in the A direction. In the example illustrated in FIG. 2, the fuel gas inlet communication hole 43i, the coolant outlet communication hole 42o, and the oxidant gas outlet communication hole 41o are sequentially arranged from an upper side to a lower side.

The fuel gas, which is supplied to the anode electrode 32, flows through the inside of the fuel gas inlet communication hole 43i.

The coolant, of which a temperature rises due to heat exchange with the unit cell 2, flows through the inside of the coolant outlet communication hole 42o.

The oxidant gas, which passes through the cathode electrode 33 and is consumed, flows through the inside of the oxidant gas outlet communication hole 41o.

In the example illustrated in the drawing, in the unit cells 2, the oxidant gas inlet communication hole 41i and the oxidant gas outlet communication hole 41o are formed at diagonal positions, and the fuel gas inlet communication hole 43i and the fuel gas outlet communication hole 43o are formed at diagonal positions. In the unit cell 2, the coolant inlet communication hole 42i is positioned between the oxidant gas inlet communication hole 41i and fuel gas outlet communication hole 43o. In addition, in the unit cell 2, the coolant outlet communication hole 42o is positioned between the oxidant gas outlet communication hole 41o and the fuel gas inlet communication hole 43i.

The central portion of the separators 21 and 22 (the separator plate 35) is formed in a concavo-convex shape through press forming and the like. In surfaces of the separators 21 and 22, which face the MEA 23, gas flow passages 45 and 46 (indicated by arrows in FIG. 2) are formed at spaces between the separators 21 and 22, and the MEA 23.

Specifically, in a surface, which faces the anode electrode 32, of the first separator 21, a fuel gas flow passage 45 is formed between the first separator 21 and the anode electrode 32 of the MEA 23. The fuel gas flow passage 45 communicates with the fuel gas inlet communication hole 43i and the fuel gas outlet communication hole 43o.

In a surface, which faces the cathode electrode 33, of the second separator 22, an oxidant gas flow passage 46 is formed between the second separator 22 and the cathode electrode 33 of the MEA 23. The oxidant gas flow passage 46 communicates with the oxidant gas inlet communication hole 41i and the oxidant gas outlet communication hole 41o.

As illustrated in FIG. 3, the stacked body 3 has a configuration in which the first separator 21 of one of the unit cells 2, and the second separator 22 of another unit cell 2 adjacent to the one unit cell 2 are stacked in the A direction in an stacking state. In addition, a coolant flow passage 55 is formed between the first separator 21 of the one unit cell 2 and the second separator 22 of the other unit cell 2. As illustrated in FIG. 2, the coolant flow passage 55 communicates with the coolant inlet communication hole 42i and the coolant outlet communication hole 42o.

The stacking structure of the unit cell 2 is not limited to the above-described configuration. For example, the unit cell may be constituted by three sheets of separators, and two sheets of MEAs each being sandwiched between the separators. In addition, design change of the layout of the communication holes may also be appropriately made.

Terminal Plate and Insulator

Figure 4:
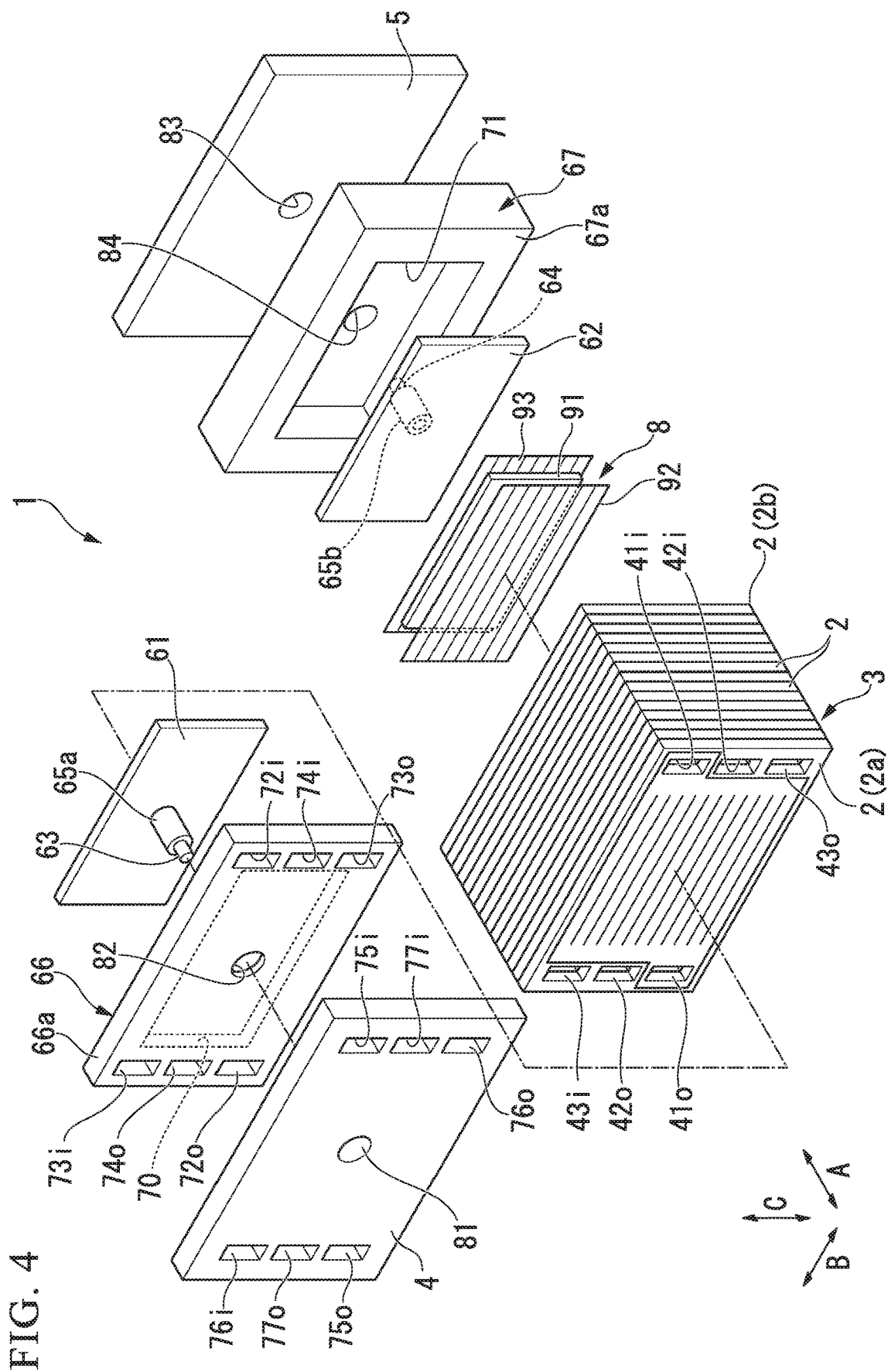
FIG. 4 is an exploded perspective view of the fuel cell stack.

FIG. 4 is an exploded perspective view of the fuel cell stack 1.

As illustrated in FIG. 4, terminal plates (a first terminal plate 61 and a second terminal plate 62) are disposed on both sides of the stacked body 3 in the A direction. An external shape of the terminal plates 61 and 62 in a front view from the A direction is set to be smaller than that of the separator 21 and 22. Output terminals 63 and 64, which protrude toward an outer side in the A direction, are respectively formed in the terminal plates 61 and 62. Insulating tubular bodies 65a and 65b are respectively inserted around the output terminals 63 and 64.

Insulators (a first insulator 66 and a second insulator 67) are respectively disposed on an outer side of the terminal plates 61 and 62 in the A direction.

An external shape of the first insulator 66 in a front view from the A direction is set to be greater than that of the first terminal plate 61. In addition, the thickness of the first insulator 66 in the A direction is set to be larger than that of the first terminal plate 61. An accommodation portion 70, which is depressed toward an outer side in the A direction, is formed in the central portion of the first insulator 66. The first terminal plate 61 is accommodated in the accommodation portion 70.

An outer peripheral portion 66a (portion located on an outer side of the accommodation portion 70) of the first insulator 66 is in close contact with the first separator 21 (seal member 36) of a unit cell (hereinafter, referred to as "first end unit cell 2a) located on one side in the A direction among the unit cells 2 from an outer side in the A direction. Gas inlet connection holes (an oxidant gas inlet connection hole 72i and a fuel gas inlet connection hole 73i), gas outlet connection holes (an oxidant gas outlet connection hole 72o and a fuel gas outlet connection hole 73o), and coolant connection holes (a coolant inlet connection hole 74i and a coolant outlet connection hole 74o), which separately communicate with the gas inlet communication holes 41i, 43i, the gas outlet communication holes 41o and 43o, and the coolant communication holes 42i and 42o, are formed in the outer peripheral portion 66a of the first insulator 66.

An accommodation portion 71, which is depressed toward an outer side in the A direction, is formed in the central portion of the second insulator 67. The second terminal plate 62 is accommodated in the accommodation portion 71. As illustrated in FIG. 3, an outer peripheral portion 67a (portion located on an outer side of the accommodation portion 71) of the second insulator 67 is in close contact with the second separator 22 (seal member 36) in a unit cell (hereinafter, referred as a second end cell 2b) located on the other side in the A direction among the unit cells 2 from an outer side in the A direction.

End Plate

As illustrated in FIG. 4, an external shape of the end plates 4 and 5 in a front view from the A direction is set in a rectangular shape greater than that of the unit cell 2. The first end plate 4 is disposed on one side of the stacked body 3 in the A direction in a state in which the first terminal plate 61 and the first insulator 66 are interposed between the first end plate 4 and the stacked body 3. Gas inlet holes (an oxidant gas inlet hole 75i and a fuel gas inlet hole 76i), gas output holes (an oxidant gas output hole 75o and a fuel gas output hole 76o), an coolant inlet hole 77i, and a coolant output hole 77o, which separately communicate with the gas inlet connection holes 72i and 73i, the gas output connection holes 72o and 73o, and the coolant connection holes 74i and 74o, are formed in the first end plate 4.

Lead-out holes 81 and 82, which respectively penetrate the first end plate 4 and the first insulator 66 in the A direction, are formed in the central portion of the first end plate 4 and the first insulator 66. The output terminal 63 of the first terminal plate 61 is led out to an outer side of the first end plate 4 in the A direction through the lead-out holes 81 and 82.

The second end plate 5 is disposed on the other side of the stacked body 3 in the A direction in a state in which the second terminal plate 62 and the second insulator 67 are interposed between the second end plate 5 and the stacked body 3.

Lead-out holes 83 and 84, which respectively penetrate the second end plate 5 and the second insulator 67 in the A direction, are formed in the central portion of the second end plate 5 and the second insulator 67. The output terminal 64 of the second terminal plate 62 is led out to an outer side of the second end plate 5 in the A direction through the lead-out holes 83 and 84.

As illustrated in FIG. 1, the first beam member 6 and the second beam member 7 are formed in a plate shape that extends along the A direction. In the beam members 6 and 7, both end surfaces in the A direction are fastened to the end plates 4 and 5 in a state of butting to end surfaces of the end plates 4 and 5 on an inner side in the A direction. Specifically, the first beam member 6 connects long sides of the end plates 4 and 5 on both sides of the stacked body 3 in the C direction. The second beam member 7 connects short sides of the end plates 4 and 5 on both sides in the B direction. A strain gauge (deformation gauge, not illustrated), which detects the amount of strain (deformation) of the beam members 6 and 7 in the A direction, is attached to the beam members 6 and 7. The strain gauge outputs an electrical signal (strain signal, deformation signal), which is based on the amount of strain of the beam members 6 and 7, to the control unit 9.

Load Measurement Unit

As illustrated in FIG. 3, the load measurement unit 8 is accommodated in the accommodation portion 71 of the second insulator 67. That is, the load measurement unit 8 is sandwiched between an outermost fuel cell of the stacked body 3 and the second terminal plate 62 in the A direction. The load measurement load unit is isolated from an electrical output of the fuel cells, and is configured to indirectly measure a mechanical load applied in the stacking, or A direction, rather than a purely electrical load. As discussed elsewhere herein, a fastening load F1, which acts on the unit cells along the stacking direction, is made up of two components, namely, an electrode load F2, which acts on a power generation surface of the unit cell in the stacking direction, and a sealing load F3, which acts on the sealing surface of the unit cell in the stacking direction. The load measurement unit 8 may be disposed at least one side between the end plates 4 and 5, and the insulators 66 and 67.

The load measurement unit 8 has a configuration in which a carbon plate (first conductive material) 91 and metal plates (second conductive materials) 92 and 93 are alternately stacked in the A direction. In an example of FIG. 3, the carbon plate 91 is sandwiched between two sheets of the metal plates 92 and 93. However, the number of sheets of the carbon plate 91 and the metal plates 92 and 93 which are stacked may be appropriately changed.

The carbon plate 91 is a porous thin plate in which the A direction is set as a thickness direction. The carbon plate 91 is formed in such a manner that an external shape thereof in a front view from the A direction is the same as an internal shape of the accommodation portion 71. That is, the carbon plate 91 is formed in a size that stacks (overlaps) the power generation surface of the MEA 23 when seen from the A direction, and does not stack (overlap) the sealing surface 23a at an outer peripheral portion of the MEA 23 in the A direction.

The metal plates 92 and 93 include a first metal plate 92 and a second metal plate 93. In the following description, the same reference numerals will be given to the same configurations in the metal plates 92 and 93, and the metal plates 92 and 93 will be explained together.

The metal plates 92 and 93 are formed in a wave shape in a cross-sectional view from the B direction. Specifically, each of the metal plates 92 and 93 includes a mountain portion 94 that is bent to an inner side in the A direction, and a valley portion 95 that is bent to an outer side in the A direction. The metal plates 92 and 93 are stacked in a state in which the valley portion 95 of the first metal plate 92 and the mountain portion 94 of the second metal plate 93 are made to face each other in the A direction.

The mountain portion 94 of the first metal plate 92 is in contact with the second separator 22 of the second end cell 2b. The valley portion (contact portion) 95 of the first metal plate 92 is in contact with the carbon plate 91.

The mountain portion (contact portion) 94 of the second metal plate 93 is in contact with the carbon plate 91. The valley portion 95 of the second metal plate 93 is in contact with the second terminal plate 62.

The metal plates 92 and 93 are formed in such a manner that an external shape thereof in a front view from the A direction is the same as an internal shape of the accommodation portion 71. That is, the metal plates 92 and 93 are formed in a size which stacks (overlaps) the power generation surface of the MEA 23 when seen from the A direction, and does not stack (overlap) the sealing surface 23a at the outer peripheral portion of the MEA 23 in the A direction. In addition, the metal plates 92 and 93 can be manufactured by cutting out an outer peripheral portion of the separator plate 35. However, the metal plates 92 and 93 may be manufactured separately from the separator plate 35 by using a conductive thin plate.

A detection unit 87, which detects a voltage drop between the metal plates 92 and 93, is connected to the load measurement unit 8. The detection unit 87 includes a first detection terminal 97, a second detection terminal 98, and a voltmeter 99.

A first end of the first detection terminal 97 is electrically connected to the first metal plate 92.

A first end of the second detection terminal 98 is electrically connected to the second metal plate 93.

Second ends of the detection terminals 97 and 98 are connected to the voltmeter 99.

Control Unit

The control unit 9 mainly includes a fastening load setting unit 100, an electrode load setting unit 101, a sealing load setting unit 102, and a maintenance time determination unit 103.

The fastening load setting unit 100 sets a fastening load F1 on the basis of the strain signal that is output from the strain gauge. The fastening load represents a load, which is applied to the stacked body 3 (unit cells 2) from the end plates 4 and 5, in the A direction.

Figure 5:
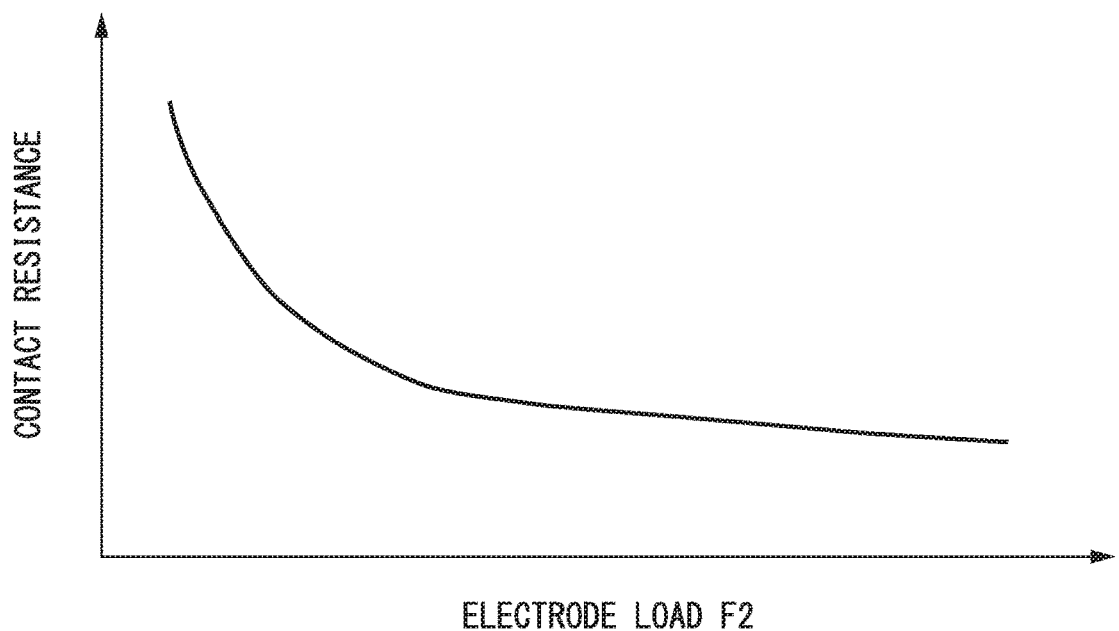
FIG. 5 is a graph illustrating a relationship between contact resistance and an electrode load.

The electrode load setting unit 101 calculates an electrode load F2 on the basis of a voltage signal that is output from the voltmeter 99. Specifically, the electrode load setting unit 101 calculates contact resistance between the metal plates 92 and 93, and the carbon plates 91 on the basis of the voltage signal that is output from the voltmeter 99. Continuously, the electrode load setting unit 101 calculates an electrode load on the basis of the contact resistance that is calculated. For example, as illustrated in FIG. 5 the electrode load is calculated on the basis of a map, which is correlated with contact resistance. That is, a voltage drop between the metal plates 92 and 93 varies in accordance with the contact resistance between the metal plates 92 and 93, and the carbon plate 91. In this case, if the electrode load decreases, the contact resistance between the metal plates 92 and 93, and the carbon plate 91 increases, and thus the voltage drop between the metal plates 92 and 93 increases. The electrode load represents a load that acts on the power generation surface of the unit cell 2 in the A direction.

The sealing load setting unit 102 sets a difference between the fastening load F1 calculated in the fastening load setting unit 100, and the electrode load F2 calculated in the electrode load setting unit 101 as a sealing load F3 (F3=F1−F2). The sealing load F3 represents a load that acts on the sealing surface of the unit cell 2 in the A direction.

The maintenance time determination unit 103 determines whether or not maintenance of the fuel cell stack 1 is necessary on the basis of the sealing load F3 that is calculated in the sealing load setting unit 102. For example, when the sealing load F3 becomes equal to or less than a predetermined sealing load threshold value Fa, the maintenance time determination unit 103 determines that the maintenance is necessary.

In the fuel cell stack 1 configured as described above, oxidant gas, which is supplied into the stacked body 3, flows through the oxidant gas inlet communication hole 41i of the unit cells 2 in a direction toward the second end plate 5 in the A direction. The oxidant gas, which flows through the oxidant gas inlet communication hole 41i, is introduced into the oxidant gas flow passage 46 and is supplied to the cathode electrode 33 of the MEA 23.

On the other hand, the fuel gas, which is supplied into the stacked body 3, flows through the fuel gas inlet communication hole 43i of the unit cells 2 in a direction toward the second end plate 5 in the A direction. The fuel gas, which flow through the fuel gas inlet communication hole 43i, is introduced into the fuel gas flow passage 45, and is supplied to the anode electrode 32 of the MEA 23.

As a result, a hydrogen ion, which occurs due to a catalytic reaction in the anode electrode 32, passes through the solid polymer electrolyte membrane 31, and moves to the cathode electrode 33. In the cathode electrode 33, the hydrogen ion causes an electrochemical reaction with the oxidant gas, and thus power generation occurs.

Then, the oxidant gas, which is supplied for the power generation in the cathode electrode 33 and is consumed, is introduced into the oxidant gas outlet communication hole 41o. The consumed oxidant gas, which is introduced into the oxidant gas outlet communication hole 41o, flows through the oxidant gas outlet communication hole 41o in a direction toward the first end plate 4 in the A direction. Then, the oxidant gas, which is consumed, is discharged to the outside of a vehicle through a discharge path (not illustrated).

On the other hand, the fuel gas, which is supplied for the power generation in the anode electrode 32 and is consumed, is introduced into the fuel gas outlet communication hole 43o. The consumed fuel gas, which is introduced into the fuel gas outlet communication hole 43o, flows through the inside of the fuel gas outlet communication hole 43o in a direction toward the first end plate 4 in the A direction. Then, the fuel gas, which is consumed, is returned to the fuel gas inlet communication hole 43i through a circulation path (not illustrated). In addition, the fuel gas, which is periodically discharged from the circulation path, is mixed and diluted with the consumed oxidant gas through a diluter, and is discharged to the outside of the vehicle.

In addition, a coolant, which is supplied into the stacked body 3, flows through the inside of the coolant inlet communication hole 42i in a direction toward the second end plate 5 in the A direction. The coolant, which flows through the inside of the coolant inlet communication hole 42i, is supplied to a coolant flow passage 55 that is located between the unit cells 2, and thus heat exchange is carried out with the unit cells 2. Then, the coolant is introduced into the coolant outlet communication hole 42o, and flows through the inside of the coolant outlet communication hole 42o in a direction toward the first end plate 4 in the A direction, and is discharged from the stacked body 3. The coolant, which is discharged from the stacked body 3, is supplied again into the stacked body 3 after passing through the inside of a coolant circulation flow passage (not illustrated) and flowing through a radiator, a drive motor, and the like.

Method of Determining Maintenance Time

Figure 6:
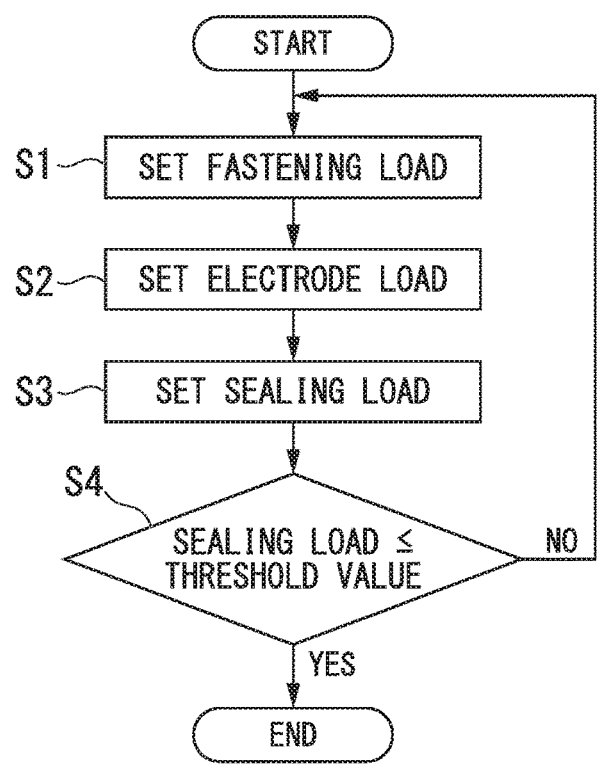
FIG. 6 is a flowchart illustrating a method of determining maintenance time.

Next, description will be given of a method of determining maintenance time in the fuel cell stack 1. FIG. 6 is a flowchart illustrating the method of determining the maintenance time. The following routines are mainly executed by the control unit 9.

As illustrated in FIG. 6, in step S1, the fastening load setting unit 100 sets the fastening load F1 on the basis of the strain signal that is output from the strain gauge.

Next, in step S2, the electrode load setting unit 101 sets the electrode load F2 from the map illustrated in FIG. 5 on the basis of the voltage signal that is output from the voltmeter 99.

In step S3, the sealing load setting unit 102 sets a difference between the fastening load F1 calculated in the fastening load setting unit 100 and the electrode load F2 calculated in the electrode load setting unit 101 as the sealing load F3.

In step S4, the maintenance time determination unit 103 determines whether or not the sealing load F3 set in the sealing load setting unit 102 is equal to or less than the sealing load threshold value Fa (determination process).

In a case where the determination result in step S4 is "NO", it is determined that a desired sealing load F3 acts, and thus maintenance is not necessary. In this case, the process returns to step S1, and the above-described routines are repeated.

On the other hand, the determination result in step S4 is "YES", it is determined that the sealing load F3 decreases, and thus maintenance is necessary.

Figure 7:
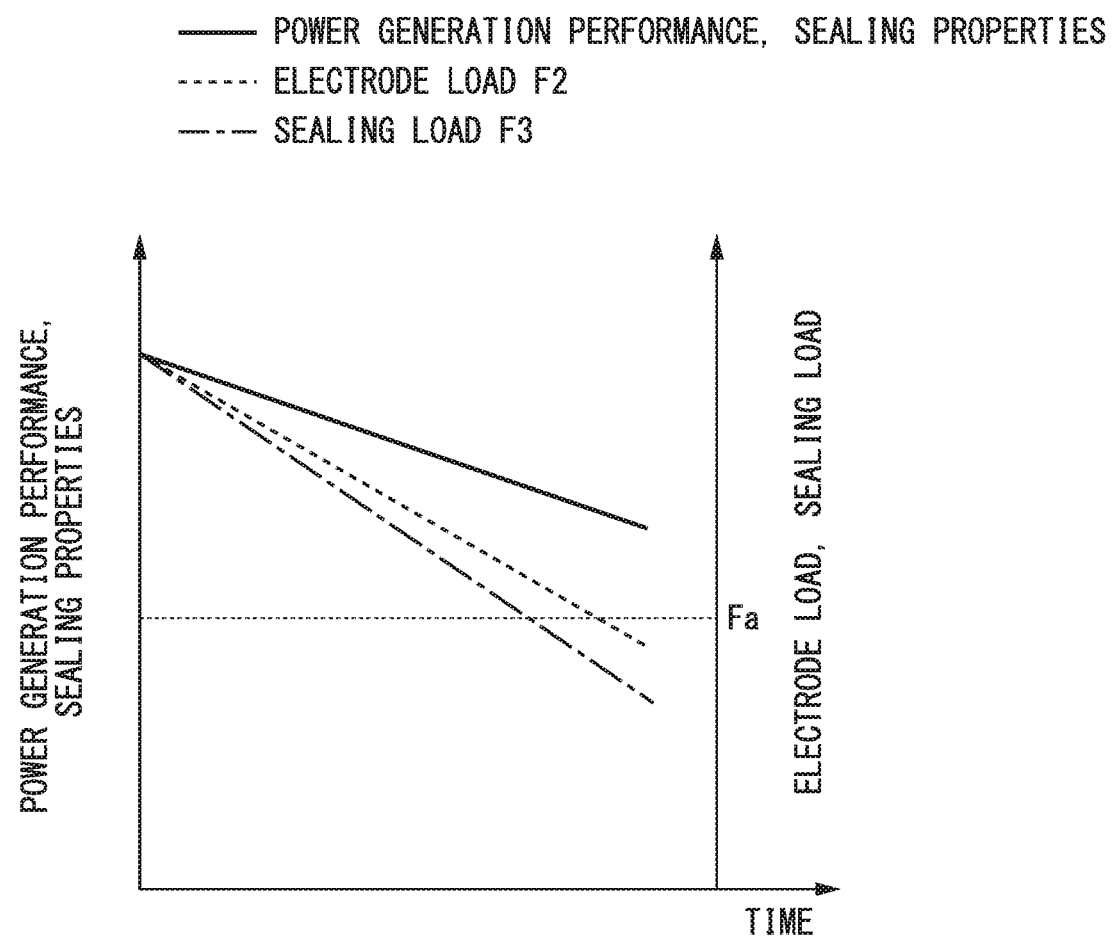
FIG. 7 is a graph illustrating a relationship between time, power generation performance, sealing properties, an electrode load, and a sealing load.

FIG. 7 is a graph illustrating a relationship between time, power generation performance, sealing properties, the electrode load F2, and the sealing load F3.

As illustrated in FIG. 7, it can be seen that the electrode load F2 or the sealing load F3 decreases in the fuel cell stack 1 with the passage of time. As the cause for the decrease in the electrode load F2, mechanical deterioration and chemical deterioration of the MEA 23 with the passage of time, and the like are considered. When the electrode load F2 decreases, a resistance overvoltage increases due to an increase in contact resistance between the metal plates 92 and 93, and the carbon plate 91. According to this, extraction efficiency of electric power that is generated in the unit cells 2 decreases, and thus power generation performance decreases.

In addition, as the cause for the decrease in the sealing load F3, deterioration of the seal member 36 with the passage of time, and the like are considered. When the sealing load F3 decreases, sealing properties between the unit cells 2 adjacent to each other decrease, and thus there is a concern that the decrease in the sealing properties leads to leakage of a reaction gas, and the like.

Figure 8:
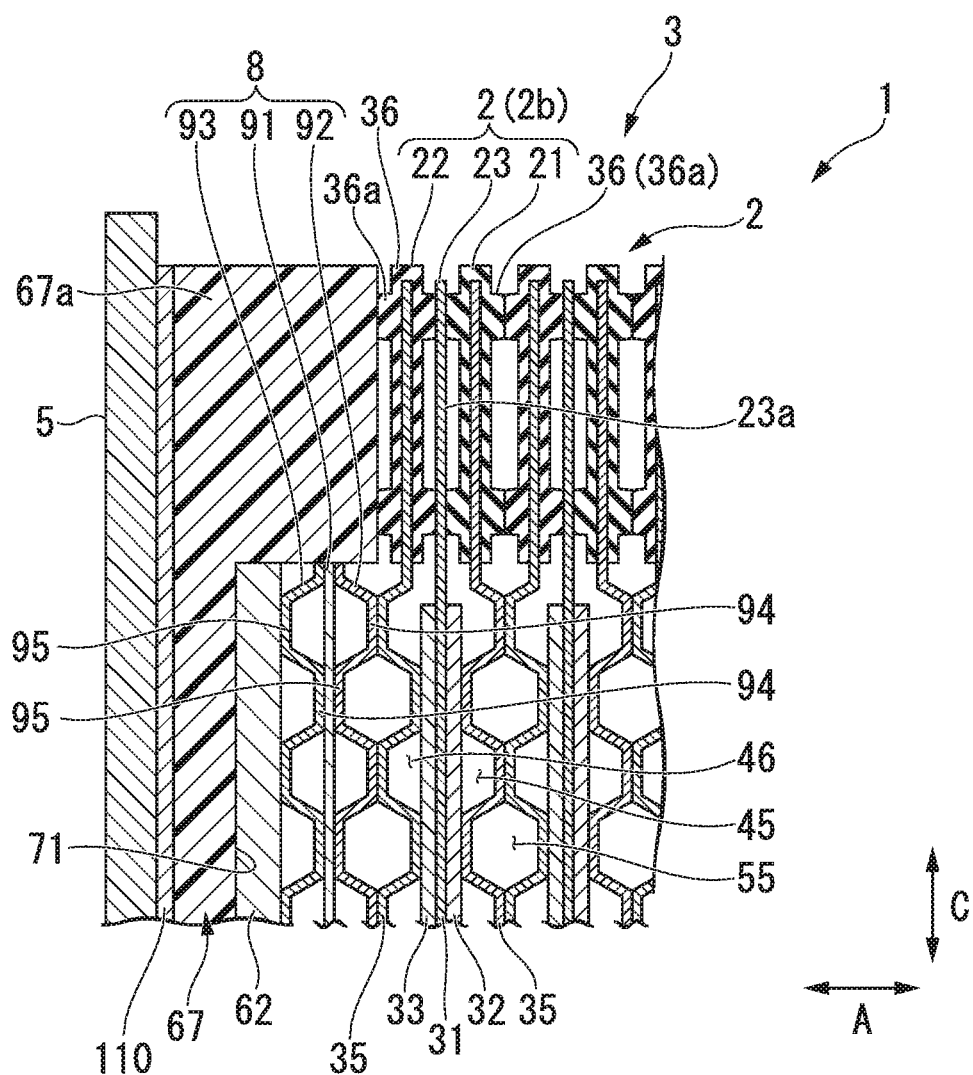
FIG. 8 is a view illustrating a maintenance method, and is a cross-sectional view of the fuel cell stack which corresponds to FIG. 3.

FIG. 8 is a view illustrating a maintenance method, and is a cross-sectional view of the fuel cell stack 1 which corresponds to FIG. 3.

As illustrated in FIG. 8, in a case where it is determined in step S4 that maintenance is necessary as described above, maintenance of the fuel cell stack 1 is performed. As the maintenance method, for example, a configuration, in which a detachable shim member 110 is interposed between the second end plate 5 and the second insulator 67, is considered. The shim member 110 is formed in such a manner that an external shape in a front view from the A direction is the same as that of, for example, the second insulator 67.

In addition, when the shim member 110 is interposed between the second end plate 5 and the second insulator 67, it is possible to increase the fastening load F1, which acts on the stacked body 3, in the A direction. After the shim member 110 is interposed therebetween at an initial state, the number of sheets of the shim member 110 may be increased or the shim member 110 may be replaced with another shim member 110 having a different thickness during maintenance. In addition, the shim member 110 may be interposed between the first end plate 4 and the first insulator 66.

Figure 9:
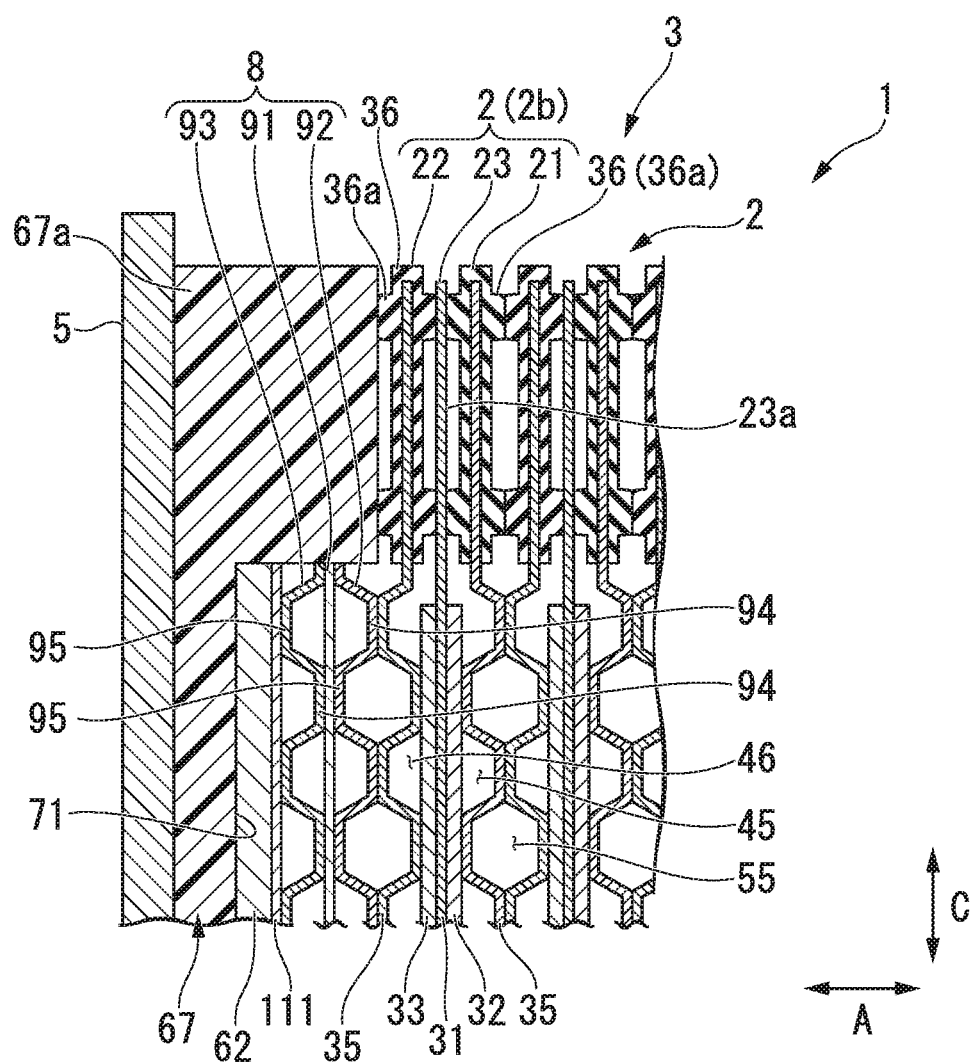
FIG. 9 is a view illustrating a maintenance method, and is a cross-sectional view of the fuel cell stack which corresponds to FIG. 3.

FIG. 9 is a view illustrating the maintenance method, and is a cross-sectional view of the fuel cell stack 1 which corresponds to FIG. 3.

As illustrated in FIG. 9, a shim member 111 may be interposed between the second terminal plate 62 and the load measurement unit 8 on an inner side of the accommodation portion 71 of the second insulator 67. The shim member 111 is formed in such a manner that an external shape in a front view from the A direction is the same as that of the power generation surface of the unit cells 2.

In addition, when the shim member 111 is interposed between the second terminal plate 62 and the load measurement unit 8, it is possible to increase the electrode load F2, which acts on the power generation surface of the unit cells 2, in the A direction. After the shim member 111 is interposed therebetween at an initial state, the number of sheets of the shim member 111 may be increased or the shim member 111 may be replaced with another shim member 111 having a different thickness during maintenance. In addition, the shim member 111 may be interposed between the first terminal plate 61 and the stacked body 3.

As described above, this embodiment has a configuration in which the load measurement unit 8, which detects the electrode load F2 acting on the power generation surface of the unit cells 2 in the A direction, is provided between the second end plate 5 and the stacked body 3.

According to this configuration, it is possible to detect a decrease in the electrode load F2 in accordance with an increase in contact resistance by detecting a voltage drop between the metal plates 92 and 93 in the load measurement unit 8. In this case, for example, it is possible to detect the electrode load F2 that acts on the power generation surface of the unit cells 2 in a more accurate and simple manner in comparison to a configuration of detecting the fastening load F1 acting on the entirety of a surface, which includes the power generation surface and the sealing surface (for example, the sealing surface 23a), of the unit cells 2 in the A direction. In addition, in a case of detecting the fastening load F1, it is possible to detect the sealing load F3, which acts on the sealing surface (for example, the sealing surface 23a) of the unit cells 2, on the basis of the fastening load F1 and the electrode load F2. As a result, it is possible to detect a load that acts on each site of the unit cells 2, and thus it is easy to specify maintenance time due to a decrease in a load or a cause for the decrease in the load. Accordingly, it is possible to improve maintenance properties.

In addition, the load measurement unit 8 is provided at an end of the fuel cell stack 1, and thus a load more stably acts on the load measurement unit 8 in comparison to a case where the load measurement unit is provided on an intermediate side of the stacked body 3. As a result, it is possible to enhance measurement accuracy.

Furthermore, in the load measurement unit 8, the carbon plate 91 is interposed between the metal plates 92 and 93, and thus it is possible to further increase a voltage drop during a decrease in the load in comparison to a case where the metal plates 92 and 93 are brought into direct contact with each other.

In addition, in this embodiment, the accommodation portion 71, which accommodates the load measurement unit 8, is formed in the second insulator 67 at a position that faces the power generation surface of the second end cell 2b in the A direction.

According to this configuration, it is possible to suppress a positional deviation of the load measurement unit 8 with respect to the unit cells 2 in an in-plane direction (B direction and C direction) of the unit cells 2, and it is possible to secure conduction between the power generation surface of the unit cells 2 and the load measurement unit 8. In addition, it is possible to suppress an enlargement the fuel cell stack 1 in the A direction of in accordance with addition of the load measurement unit 8.

In addition, since the shim member 110 or 111 is provided between the second insulator 67 and the load measurement unit 8, it is possible to more simply control the fastening load F1 and the electrode load F2 only through adjustment of the thickness or the number of sheets of the shim member 110 or 111. As a result, it is possible to achieve an additional improvement in the maintenance properties.

In this embodiment, the maintenance time is determined on the basis of whether or not the sealing load F3 is equal to or less than the sealing load threshold value Fa, and thus it is possible to prevent the subsequent power generation performance and sealing properties from decreasing in advance. As a result, it is possible to secure operation reliability.

In the above-described embodiment, description has been given of a configuration in which the carbon plate 91 and the metal plates 92 and 93 are used as the first conductive material and the second conductive material, but there is no limitation only to the configuration. Design change can be appropriately made as long as the first conductive material and the second conductive material are different kinds of conductive materials.

In the above-described embodiment, description has been given of a case where in the metal plates 92 and 93 which formed in a wave shape, the valley portion 95 of the first metal plate 92 and the mountain portion 94 of the second metal plate 93 are configured as contact portions, but there is no limitation only to the configuration. The contact portions of the metal plates 92 and 93 may be appropriately changed as long as the contact portions can be in contact with the carbon plate 91.

In the above-described embodiment, description has been give of a configuration in which a load is controlled through interposing of the shim member 110 or 111 during maintenance, but there is no limitation only to the configuration. Maintenance can be performed by various methods by using a screw mechanism, and the like.

In the above-described embodiment, description has been given of a configuration in which the maintenance time is determined on the basis of the sealing load, but there is no limitation only to the configuration. For example, the maintenance time may be determined on the basis of only the electrode load F2. In this case, in a case where the voltage drop between the metal plates 92 and 93 is equal to or greater than a threshold value, the electrode load F2 further decreases than a desired value, and thus the maintenance can be determined as necessary. In addition, the maintenance time may be determined on the basis of at least one of the electrode load F2 and the sealing load F3.

In the above-described embodiment, description has been given of a configuration in which the determination of the maintenance time is made by the control unit 9, but there is no limitation only to the configuration. The maintenance time may be manually determined on the basis of the voltage drop that is detected by the detection unit 87.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell stack, comprising:
   a fuel cell stacked body in which a plurality of fuel cells are stacked in a stacking direction;
   a pair of end plates which sandwiches the fuel cell stacked body from both sides in the stacking direction; and
   a load measurement unit that is isolated from an electrical output of the fuel cells, the load measurement unit disposed between one of the end plates and an outermost fuel cell of the fuel cell stacked body, and which is configured to detect an electrode load, which acts on a power generation surface of the fuel cells, in the stacking direction,
   wherein the load measurement unit includes,
   a first plate of a first conductive material,
   a pair of second plates of a second conducive material, which sandwich the first plate therebetween in the stacking direction, and each of which includes a contact portion that is in contact with the first plate, and
   a detection unit that is configured to detect a voltage drop between the second plates, which face each other in the stacking direction, with the first plate interposed therebetween, wherein the detection unit includes,
   a first terminal connected to one of the pair of second plates, and
   a second terminal connected to the other one of the pair of second plates,
   wherein the detection unit is configured to detect the voltage drop between the second plates via the first terminal and the second terminal.

2. The fuel cell stack according to claim 1, wherein:
   an insulator is disposed between the one end plate and the load measurement unit, and
   an accommodation portion, which receives the load measurement unit therein from a fuel cell stacked body side in the stacking direction, wherein the accommodation portion is formed in a portion of the insulator which faces the power generation surface in the stacking direction.

\* \* \* \* \*